United States Patent [19]

Brown et al.

[11] Patent Number: 5,264,011
[45] Date of Patent: Nov. 23, 1993

[54] ABRASIVE BLADE TIPS FOR CAST SINGLE CRYSTAL GAS TURBINE BLADES

[75] Inventors: Lawrence E. Brown, Indianapolis; David L. Clingman, Carmel; Michael J. Barber, Martinsville; Kenneth R. Cross, Lebanon, all of Ind.

[73] Assignee: General Motors Corporation, Detroit, Mich.

[21] Appl. No.: 941,618

[22] Filed: Sep. 8, 1992

[51] Int. Cl.$^5$ ............................................. B24D 3/02
[52] U.S. Cl. ................................ 51/309; 29/889.2; 51/245; 51/298; 415/173.6; 416/241 B
[58] Field of Search .................. 29/156.8 B; 51/293, 51/295, 298, 309; 415/172, 174 B; 416/223 A, 241 R, 241 B

[56] References Cited

U.S. PATENT DOCUMENTS

| | | | |
|---|---|---|---|
| 3,850,590 | 11/1974 | Chalkley et al. | 51/309 |
| 4,142,872 | 3/1979 | Conradi | 51/309 |
| 4,249,913 | 2/1981 | Johnson et al. | 51/295 |
| 4,378,975 | 4/1983 | Tomlinson et al. | 51/309 |
| 4,591,364 | 5/1986 | Phaal | 51/309 |
| 4,610,698 | 9/1986 | Eaton et al. | 51/295 |
| 4,741,973 | 5/1988 | Condit et al. | 428/553 |
| 4,802,828 | 2/1989 | Rutz et al. | 51/293 |
| 4,854,196 | 8/1989 | Mehan | 76/101 R |
| 5,096,465 | 3/1992 | Chen et al. | 51/295 |

FOREIGN PATENT DOCUMENTS 2108534 10/1982 United Kingdom .
21085344 5/1983 United Kingdom .

*Primary Examiner*—Mark L. Bell
*Assistant Examiner*—Willie J. Thompson
*Attorney, Agent, or Firm*—Cary W. Brooks; Domenica N. S. Hartman

[57] ABSTRACT

An abrasive system and a processing procedure is provided which permits the direct installation of a thick abrasive blade tip cap onto a cast single crystal turbine rotor blade during a single heating schedule requiring only one furnace operation. The composition of the abrasive blade tip cap advantageously utilizes the high temperature performance capabilities of the single crystal alloy without significantly affecting its mechanical properties as a consequence of the processing necessary to permanently bond the abrasive blade tip cap to the rotor blade. A semi-rigid blade tip cap preform is first formed and positioned on the tip of the rotor blade. The preform and rotor blade are then heated in a vacuum furnace according to a temperature schedule entailing heating rates, holding temperatures and durations which are sufficient to bond and consolidate the preform. The rotor blade is then rapidly cooled in the vacuum furnace to retain the single crystal structure of the rotor blade.

20 Claims, 2 Drawing Sheets

ABRASIVE BLADE TIPS FOR CAST SINGLE CRYSTAL GAS TURBINE BLADES

The present invention generally relates to abrasive materials and methods for adhering abrasive materials to a substrate. More particularly, this invention relates to an improved abrasive material and method for adhering the abrasive material to a turbine blade wherein the method entails a single furnace operation such that the process is particularly suitable for single crystal turbine blades.

BACKGROUND OF THE INVENTION

In the turbine section of a turbine engine, the turbine rotor is circumscribed by a shroud such that the shroud is adjacent the tips of the rotor blades extending from the hub of the rotor. The shroud serves to channel the combustion gases through the turbine section of the turbine engine and prevents the bulk of the turbine engine's combustion gases from bypassing the turbine rotor blades. However, a portion of the gases are able to bypass the rotor blades through a gap present between the rotor blade tips and the shroud. Because the energy of the gases directed through the rotor blades is used to rotate the turbine rotor assembly and any compressor upstream of the turbine section, turbine engine efficiency can be increased by limiting the gases which are able to bypass the rotor blades through this gap.

Manufacturing tolerances, differing rates of thermal expansion and dynamic effects limit the extent to which this gap can be reduced. Any rubbing contact between the rotor blade tips and the shroud will spall the tips of the rotors. Spalling will tend to further increase the gap described above, thereby reducing engine efficiency. In addition, spalling tends to promotes structural fatigue in the rotor blades, causing the useful life of the rotor to be shortened.

As an alternative, it is well known in the art to form a dynamic seal between the rotor blades and the shroud by forming an abrasive tip cap on the end of one or more rotor blades, and more preferably, on each rotor blade. During operation of the turbine, the abrasive tip caps abrade a groove in the shroud as a result of numerous "rub encounters" between the abrasive tip caps and the shroud. The groove, in cooperation with the rotor blade tips as they partially extend into the groove, forms a virtual seal between the rotor blade tips and the shroud. The seal reduces the amount of gases which can bypass the rotor blades, and thereby improves the efficiency of the turbine engine.

Various materials and processes have been suggested to provide a suitable abrasive tip cap on turbine rotor blades. Typical abrasive materials used include silicon carbide, aluminum oxide, tantalum carbide and cubic boron nitride. Aluminum oxide, or alumina, is generally preferred because of its high temperature capabilities and oxidation resistance. In that such abrasive particles do not provide a structurally sound material, they are incorporated with a metal matrix, including for example, nickel or cobalt-base alloys, to provide a sufficiently strong structure which can be bonded to the blade tip. However, the thickness of such a metal matrix is often limited because of the structural weakness of the abrasive composition.

In some applications, it is conventional to apply the abrasive composition to the rotor blade tip using a thermal spray technique, such as plasma spraying or detonation gun spraying. While suitable for many purposes, thermal spray techniques are inefficient in that only part of the abrasive composition contacts and adheres to the rotor blade tip, while much of the thermal spray completely misses the target. More importantly, thermal spraying damages or destroys the morphology of the abrasive particles, making them unsuitable for the intended purpose. In addition, subsequent processes are typically necessary to provide the adhesion and structural integrity necessary for the abrasive composition to survive the hostile environment of a turbine engine. Such steps often include adhering the abrasive composition to the blade tip during a first heating and cooling cycle, and later depositing an additional quantity of the metal matrix over the abrasive composition through a second heating and cooling cycle, such as during hot isostatic pressing. As an alternative, it has also been suggested to melt the tip of the blade, such as with lasers, introduce the abrasive to the blade tip, and then resolidify the blade tip.

While the above processes may be suitable for some turbine blade structures, turbine blades used in modern gas turbine engines are often fabricated from cast high temperature nickel-base superalloys having a single crystal microstructure. Single crystal blades are characterized by extremely high oxidation resistance and mechanical strength at elevated temperatures, which are necessary for the performance requirements of modern turbine engines. However, the single crystal microstructure must not be affected by the process by which the rotor blade abrasive tip caps are secured to the rotor blades. In particular, the process must not recrystallize the single crystal microstructure of the rotor blade, such that the high temperature properties of the rotor blade are lost or diminished. As a result, processes which entail melting the rotor blade tip to the single crystal rotor blade are entirely unacceptable. In addition, repeated thermal cycling of the rotor blades runs the risk of degrading the single crystal microstructure of the rotor blade.

Thus, it would be desirable to provide an abrasive composition which can be readily formed into an abrasive blade tip cap and which can be attached to a turbine rotor blade in a single heating and cooling cycle so as to minimize any degradation of the microstructure of a single crystal turbine rotor blade.

SUMMARY OF THE INVENTION

It is an object of this invention to provide a method for attaching an abrasive blade tip cap to a rotor blade in a single heating and cooling cycle to preserve the microstructure of a single crystal rotor blade.

It is a further object of this invention that such a method include the formulation of an abrasive blade tip cap preform which can be adhered as a unit to a rotor blade during a single heating and cooling cycle.

Lastly, it is another object of this invention that such an abrasive blade tip cap preform be of sufficient thickness so as to provide sufficient stock for machining the abrasive blade tip cap to tolerance while retaining adequate thickness to perform repeated rub encounters with a turbine engine shroud over the life of the turbine engine.

In accordance with a preferred embodiment of this invention, these and other objects and advantages are accomplished as follows.

According to the present invention, there is provided an abrasive composition and a process for attaching the abrasive composition to a rotor blade of a turbine engine, wherein the process entails a single heating cycle to adhere the abrasive composition to the tip of the rotor blade. As a result, the process is particularly suitable for forming abrasive tip caps for single crystal rotor blades, such as those formed from nickel-base superalloys.

The abrasive composition is preferably formed as a mat from which a rotor blade tip cap preform can be readily sized and shaped to fit the shape of the rotor blade tip. The abrasive composition generally includes a metal powder matrix containing a cobalt-base braze alloy and a cobalt alloy containing boron in sufficient amounts to aid in wetting and bonding together all of the preform constituents into a fully densified matrix. Ceramic abrasive particles, and preferably aluminum oxide particles, are interspersed in the metal powder matrix. The ceramic abrasive particles are coated with a thin layer of a reactive metal, such as titanium, which serves as a wetting agent to promote a metallurgical bond between the abrasive particles and the metal powder matrix.

More specifically, the rotor blade abrasive tip cap preform includes a first layer which contains the ceramic abrasive particles interspersed in the metal powder matrix, and a second layer formed from the cobalt-base braze alloy alone. A binder is provided between the first and second layers to adhere the second layer to the first layer. In addition, it is preferable that a binder and a fluorocarbon powder be distributed throughout the first layer. The binder serves to impart green strength to the preform while the fluorocarbon powder serves to create a cleansing action between the matrix and the abrasive particles and between the preform and the bonding surfaces during the heating process to ensure a sufficient bond between the preform and the blade tip. Finally, it is also preferable to temporarily attach a layer of cobalt-based braze tape to the blade tip using a suitable transfer tape prior to metallurgically bonding the preform to the blade tip with a furnace operation.

The bonding process of this invention consists of a single heating and cooling cycle so as to minimize degradation of the single crystal microstructure of the rotor blade alloy. The abrasive composition of the present invention is specifically formulated to take advantage of the high temperature capabilities of the single crystal rotor blade such that a single heating cycle will suitably bond the preform to the rotor blade. The bonding process and abrasive composition of the present invention permit a thick abrasive rotor blade tip cap to be permanently secured to the rotor blade tip. As a result, even after grinding to the final dimensions, the abrasive rotor blade tip cap possesses the capability for long service life, and provides the requisite rubbing action with the shroud during the operation of a turbine engine to form a seal between the rotor blades and the shroud.

The preferred heating schedule includes heating the preform, which is mounted on the rotor blade tip, in a vacuum to about 1100° F. for a duration sufficient to volatilize the binders and fluorocarbon powder but at a rate sufficiently low to prevent porosity in the abrasive composition due to outgassing. The preform and rotor blade are then further heated to about 2000° F. at a rate sufficient to maintain vacuum pressure no greater than about $1 \times 10^{-4}$ torr, and for a duration sufficient to thermally stabilize the rotor blade prior to reaching bonding temperature. The temperature of the preform and rotor blade is then further raised at a rate sufficient to prevent liquation of the braze tape, and held at about 2225° F. for a duration sufficient to braze and consolidate the abrasive tip preform to the rotor blade tip. Finally, the preform and rotor blade are furnace cooled to a temperature of about 2000° F., after which the preform and rotor blade are further cooled to below about 1400° F. at a rate sufficient to maintain the desired microstructure and strength of the single crystal rotor blade.

Using this preferred heating schedule, the abrasive particles are tightly bonded within the metal powder matrix, and the rotor blade tip cap is tightly bonded to the rotor blade such that the rotor blade tip cap forms a structurally integral portion of the rotor blade in terms of strength and durability. The process of the present invention permits relatively thick preforms to be bonded to the rotor blades such that subsequent machining of the rotor blade tips in the assembled rotor can be performed to bring the rotor assembly into tolerance, while also ensuring that sufficient abrasive material will remain to provide repeated rub encounters over the life of the turbine engine.

In addition, the heating schedule ensures that alteration of the single crystal microstructure is minimized, such that the high temperature capabilities of the superalloy will remain. The single furnace operation involved in the heating schedule of the present invention also provides a significant economic advantage from the standpoint of time, labor and energy requirements. As a result, the present invention is highly suitable for the mass production of turbine rotor blades.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein.

DETAILED DESCRIPTION OF THE INVENTION

An abrasive system and a processing procedure is provided which permits the direct installation of a thick abrasive blade tip cap onto a single crystal cast turbine rotor blade during a single heating schedule that accordingly requires only one furnace operation. The composition of the abrasive blade tip cap advantageously utilizes the high temperature performance capabilities of the single crystal rotor blade 12 without significantly affecting the mechanical properties of the single crystal rotor blade 12 which would arise as a consequence of the processing necessary to permanently bond the abrasive blade tip cap to the rotor blade.

The composition of the preferred abrasive blade tip cap and the preferred heating schedule are particularly adapted for cast single crystal nickel-base superalloys, such as used in the rotor blade 12. The preferred nickel-base superalloy consists of, by weight, about 10 percent tungsten, about 10 percent cobalt, about 9 percent chromium, about 5.5 percent aluminum, about 1.5 percent tantalum, about 1.5 percent titanium, about 1.0 percent hafnium, about 0.02 percent boron, about 2.5 percent molybdenum, about 0.15 percent carbon, and about 0.05 percent zirconium, with the balance being nickel. Such an alloy is commercially available from Cannon-Muskegon under the trade designation CMSX-3. However, it is foreseeable that other suitable nickel-base alloys, as well as cobalt or iron-base alloys, could be substituted with similar results.

Figure 1:
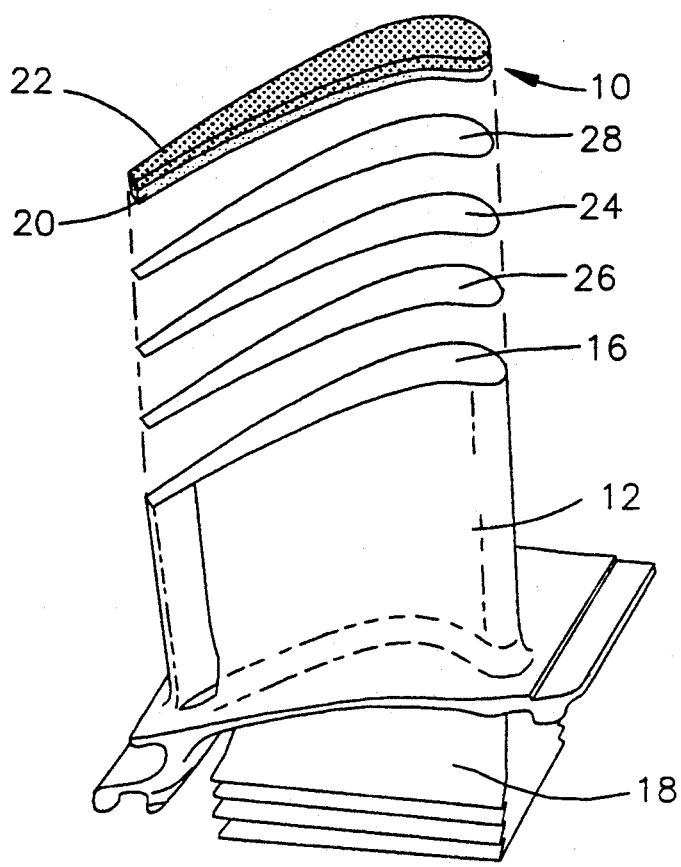
FIG. 1 shows an exploded view of the component details of a turbine rotor blade and abrasive rotor blade tip cap in accordance with this invention.
Figure 2:
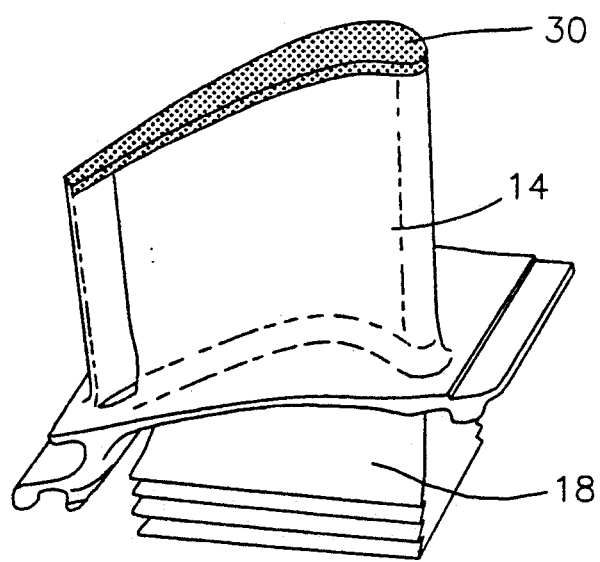
FIG. 2 shows a side view of a turbine rotor blade on which there has been attached a rotor blade tip cap in accordance with this invention.

In accordance with the preferred embodiment of this invention, an abrasive blade tip cap preform 10 is brazed to a single crystal turbine rotor blade 12 (FIG. 1) to form an abrasive blade tip cap 30 of an abrasive rotor blade 14 (FIG. 2). As seen in FIG. 1, the rotor blade 12 has a tip portion 16 which is remote from the rotor blade's base 18 by which the rotor blade 12 is mounted to a rotor hub (not shown) to form a turbine rotor assembly (not shown). The tip 16 of the rotor blade 12 is substantially flat, though having a compound curvature referred to as the arc drop. The arc drop of the blade tip 16 results from the rotor blade 12 being ground to conform to the cylindrical internal surface of the turbine shroud (not shown).

The abrasive blade tip cap preform 10 can be attached to one or more rotor blades 12 according to the method of the present invention, though in the preferred embodiment, each rotor blade 12 would have an abrasive blade tip cap preform 10 bonded thereto. With the abrasive rotor blades 14 mounted to the hub within a turbine engine (not shown), the abrasive-blade tip caps 30 will be proximate to the shroud which circumscribes the turbine rotor assembly. The abrasive blade tip caps 30 serve to wear-form a seal track in the shroud, resulting in a virtual seal between the abrasive rotor blades 14 and the shroud which substantially prevents combustion gasses from bypassing the rotor assembly. A particular aspect of the preferred composition of the abrasive blade tip caps 30 is the ability to withstand repeated and severe rub encounters with the shroud, with only minimal loss of material from the abrasive blade tip caps 30 and preferential wear of the shroud material.

The preferred abrasive composition from which the abrasive blade tip cap preforms 10 are formed includes a metal powder matrix combined with ceramic abrasive particles. The abrasive particles are preferably about 80 to 120 mesh grit aluminum oxide particles which are coated with a reactive metal. The coated aluminum oxide particles preferably make up about 24 to about 28 weight percent, and more preferably about 26.3 weight percent, of the abrasive blade tip cap preform 10, though it is foreseeable that the coated aluminum oxide could be present in quantities of as little as 10 or as great as 50 weight percent.

Most preferably, the reactive metal coating on the aluminum oxide particles is a titanium coating which constitutes about 2 to about 4 weight percent of the coated aluminum oxide particles. As a reactive metal, the titanium serves to wet the surface of the aluminum oxide particles to promote a metallurgical bond between the particles and the metal powder matrix. Although titanium is preferred because it is known to react to both aluminum oxide and the matrix to form a metallurgical bond, other reactive metals could also be used.

It is preferable that the titanium coating be applied using known fluidized bed chemical vapor deposition techniques so as to ensure uniformity of the coating on the particles, though other suitable processes known in the art are acceptable.

The metal powder matrix is a mixture of a cobalt-base braze alloy combined with a cobalt alloy that includes boron. The cobalt-base braze alloy is preferably Aerospace Material Specification 4783 (AMS4783) having a nominal composition by weight of about 8 percent silicon, about 19 percent chromium, about 17 percent nickel, about 4 percent tungsten, about 0.8 percent boron, with the balance being cobalt. The cobalt-base braze alloy is preferably provided in particle form and has a particle size no greater than about 325 mesh. The cobalt-base braze alloy makes up about 22 to about 26 weight percent, and more preferably about 24.1 weight percent, of the abrasive blade tip cap preform 10, though it is foreseeable that the cobalt-base braze alloy could be present in quantities of as little as about 20 or as great as about 30 weight percent.

The boron-containing cobalt alloy is a proprietary composition manufactured by Union Carbide Specialty Powders of Indianapolis, Ind., and designated as Alloy No. CO-274. Boron is present in sufficient amounts to aid in wetting and bonding together all the preform constituents into a fully-densified matrix. Similar to the cobalt-base braze alloy, the boron-containing cobalt alloy is provided in particle form and has a particle size no greater than about 325 mesh. In the preferred embodiment, the boron-containing cobalt alloy makes up about 46 to about 50 weight percent, and more preferably about 48.2 weight percent, of the abrasive blade tip cap preform 10, though it is foreseeable that it could be present in quantities of as little as 42 or as great as 52 weight percent.

In addition, the abrasive blade tip cap preform 10 preferably includes a fluorocarbon powder distributed throughout the metal powder matrix. The fluorocarbon powder is preferably a polytetrafluoroethylene (PTFE) micropowder, marketed as Product No. MP 1100 and available from E.I. DuPont de Nemours and Company, Inc., Polymer Products Department, of Wilmington, Del. The fluorocarbon powder preferably makes up about 1.0 to about 2.0 weight percent, and more preferably 1.4 weight percent of the abrasive blade tip cap preform 10. However, the fluorocarbon powder may be omitted completely or provided in amounts as great as about 5 weight percent, in that the desired amount is dictated only by the need to provide a final cleansing of the matrix and abrasive particle surfaces and the bonding surfaces of the preform 10 and the rotor blade tip 16 during the high temperature consolidation of the preform structure, which will be described in detail below, and without producing excessive porosity in the abrasive blade tip caps 30.

As a final preferred additive, the preform 10 may include a binder which is distributed throughout the metal powder matrix in sufficient quantities to impart green strength to the preform 10. Such binders are well known in the art. However, the preferred embodiment utilizes a proprietary organic binder, Allison Type GAB/Production, available from Vitta Corporation of Bethel, Connecticut. The binder preferably makes up between about 2 and about 5 weight percent of the abrasive blade tip cap preform 10, though it is foreseeable that the binder can be present in quantities of as little as about 1.0 and as great as about 7.0 weight percent, in that the desired amount is dictated only by the amount of green strength desired in the abrasive blade tip cap preform 10 and the level of porosity resulting from binder volatilization which can be allowed in the consolidated abrasive blade tip cap 30.

The preform 10 is preferably cut or punched from a mat of uniform thickness and according to the shape of the blade tip 16, with an allowance being made for shrinkage during consolidation of the preform 10 as a result of the bonding process. The preform 10 has two distinct layers, as best seen in FIG. 1. The first layer 20 consists of the metal powder matrix and the titanium-coated abrasive particles combined with the fluorocarbon powder and the binder, while the second layer 22 is comprised only of the AMS 4783 cobalt-base braze alloy which serves as a reservoir to replace the organic constituents volatilized during the consolidation heating cycle, and thereby minimize the resulting porosity which would otherwise be created. The second layer 22 is nominally about 0.003 to about 0.004 inches thick, and the preform 10, combining the first and second layers 20 and 22, has a thickness of about 0.059 to about 0.065 inch. However, the thickness of the preform mat may vary substantially, depending on the blade design. Generally, mat thickness is dictated by desired cutting life and machining stock required. Due to the thickness of the preform 10 and the green strength contributed by the binder, the preform 10 is sufficiently rigid to permit handling under most manufacturing conditions. However, the binder is not otherwise an essential ingredient in the preform 10, in that the binder is volatilized during the bonding process to be described below.

The environment in which the abrasive blade tip cap preform 10 is applied to the rotor blade 12 must be clean to prevent contamination of the bonding surfaces of either the rotor blade 12 or the preform 10. The procedure for applying the preform 10 to the rotor blade 12 includes forming a bonding surface on the rotor blade tip 16 which is ground smooth with no edge breaks. The rotor blade 12 is further prepared by being degreased with a suitable solvent or detergent of a type well known in the art. The rotor blade 12 is then masked to expose only the tip 16 of the rotor blade 12, which serves as the bonding surface. The blade tip 16 is then blasted using a blasting medium, such as a nickel-base blasting medium sold under the name NICROBLAST MEDIA by Wall Colmonoy Corporation of Madison Heights, Michigan. Such a nickel-base blasting medium is preferred because it leaves a nominal nickel layer (less than about 0.0001 inch) on the rotor blade tip 16 which serves to wet its bonding surface and thereby promote bonding of the preform 10 during consolidation. However, it is foreseeable that other blasting mediums known to those skilled in the art can be used with acceptable results. Thereafter, the entire rotor blade 12 is flushed with dry, filtered air to remove any excess blasting medium.

Preferably, a one eighth inch band of stop-off, such as NICROBRAZ-GREEN STOPOFF, a product of Wall Colmonoy Corporation of Madison Heights, Michigan, is then applied to the rotor blade 12 surfaces surrounding the bonding surface to prevent brazing at these regions. A braze tape 24, and more preferably a cobalt-base braze tape comprised of the aforementioned AMS 4783 cobalt-base braze alloy having a thickness of about 0.004 inches, is then applied to the blade tip 16 using a suitable transfer tape 26, such as type 9710 Transfer Tape, a product of 3M Company of St. Paul, Minn.

The previously cut preform 10 is then temporarily attached to the tip 16 of the rotor blade 12 using a suitable transfer tape 28. The preform 10 and rotor blade 12 are then further readied for bonding and consolidation by orienting the rotor blade 12 vertically such that the preform 10 rests on top of the tip 16 of the rotor blade 12. The bonding and consolidation process must be performed in a clean, out-gassed vacuum furnace, with the furnace preferably being evacuated to a pressure of no more than about $1 \times 10^{-4}$ torr.

The preferred heating schedule between room temperature and about 1100° F. is determined by the rate at which the binder and fluorocarbon powder will volatilize. In particular, the binder and fluorocarbon powder must not volatilize at a rate which will produce porosity or distortion in the preform 10, and thus the final abrasive blade tip cap 30. Therefore, the heating rate is purposely chosen to be relatively slow so as to allow complete diffusion of the volatilized gasses through the preform 10 material without creating porosity in the preform 10.

Once the fluorocarbon powder and binder have been volatilized (i.e., above about 1100° F.), the heating schedule is determined by the need to bond and consolidate the preform 10 while also preserving the single crystal structure of the supporting nickel-base superalloy turbine blade 12. While specifically adapted to the property limitations of the preferred nickel-base superalloy, the composition of the preform 10 and the preferred heating schedule described below may also be applicable to other single crystal alloys where mechanical property requirements are met in conjunction with the constraints imposed by the required bonding cycle.

The heating rates, durations and limits for the preferred heating schedule are detailed in the table below.

TABLE I

| PREFERRED FURNACE SCHEDULE | |
|---|---|
| RATE | TEMPERATURE/TIME |
| Heat 10° F./minute (max) | Room temperature to 500 +/− 25° F. |
| Hold at: | 500 +/− 25° F. for about 5 minutes |
| Heat 3° F./minute (max) | 500 +/− 25° F. to 750 +/− 25° F. |
| Hold at: | 750 +/− 25° F. for about 5 minutes |
| 6° F./minute (max) | 750 +/− 25° F. to 900 +/− 25° F. |
| Hold at: | 900 +/− 25° F. for about 5 minutes |
| Heat 3° F./minute (max) | 900 +/− 25° F. to 1100 +/− 25° F. |
| Hold at: | 1100 +/− 25° F. for about 10 minutes |
| Heat 15° F./minute (min) | 1100 +/− 25° F. to 2000 +/− 25° F. |
| Hold at: | 2000 +/− 25° F. for about 10 minutes |
| Heat 30° F./minute (max) | 2000 +/− 25° F. to 2225 +/− 15° F. |
| Hold at: | 2225 +/− 15° F. for about 110 to about 130 minutes |
| Vacuum or gas cool | 2225 +/− 15° F. to 2000 +/− 25° F. |
| Gas fan cool | 2000 +/− 25° F. to 1400 +/− 25° F. |

Note:
Temperatures given are set points; +/− tolerances are the required control ranges.

The preferred bonding and consolidation process includes heating the preform 10 and rotor blade 12 in a vacuum of no more than about $1 \times 10^{-4}$ torr. The temperatures and durations indicated above are selected to perform the following. First, the preform 10 and rotor blade 12 are heated to a temperature of about 1100° F.+/−25° F. at a rate and for a duration which will be sufficient to ensure complete diffusion of the volatilized gasses through the preform 10. As shown in Table I, intermediate holding temperatures of 500° F., 750° F. and 900° F. are preferred to prevent porosity formation, but these intermediate holding temperatures are not absolutely necessary. The preform 10 and rotor blade 12 are preferably held at about 1100° F.+/−25° F. for about 10 minutes, which is sufficient to prevent porosity within the preform 10.

The temperature of the preform 10 and rotor blade 12 is then further raised at a rate of about 15° F. per minute minimum, which is sufficient to minimize the exposure of the rotor blade 12 to high temperature, and held at about 2000° +/−25° F. for about 10 minutes, a duration which is sufficient to thermally stabilize the rotor blade 12. Thereafter, the temperature of the preform 10 and rotor blade 12 is further raised at a rate of about 30° F. per minute maximum, which is sufficient to prevent liquation of the AMS 4783 braze tape 24, and held at about 2225° +/−15° F. for about 110 to about 130 minutes, a duration which is sufficient to melt the metal powder matrix. The molten metal powder matrix forms a liquid phase which surrounds the abrasive particles and wets the rotor blade tip 16. In addition, the molten metal powder matrix wets and reacts with the titanium coating on the abrasive particles in a manner that produces a strong metallurgical bond upon cooling.

In particular, it is believed that the titanium in immediate contact with the aluminum oxide surface bonds to oxygen in the aluminum oxide, essentially becoming a part of the oxide structure. Titanium which is located in the coating further from the aluminum oxide particle remains metallic. Because of its metallic nature, the titanium coming in contact with the molten metal powder matrix improves wetting and probably alloys itself with the braze alloy. Thus, both the abrasive particle-titanium interface and the titanium-matrix interface are strengthened by chemical bonding so that the overall bond between the abrasive blade tip cap 30 and the rotor blade 12 is stronger than mere mechanical joining.

Figure 3:
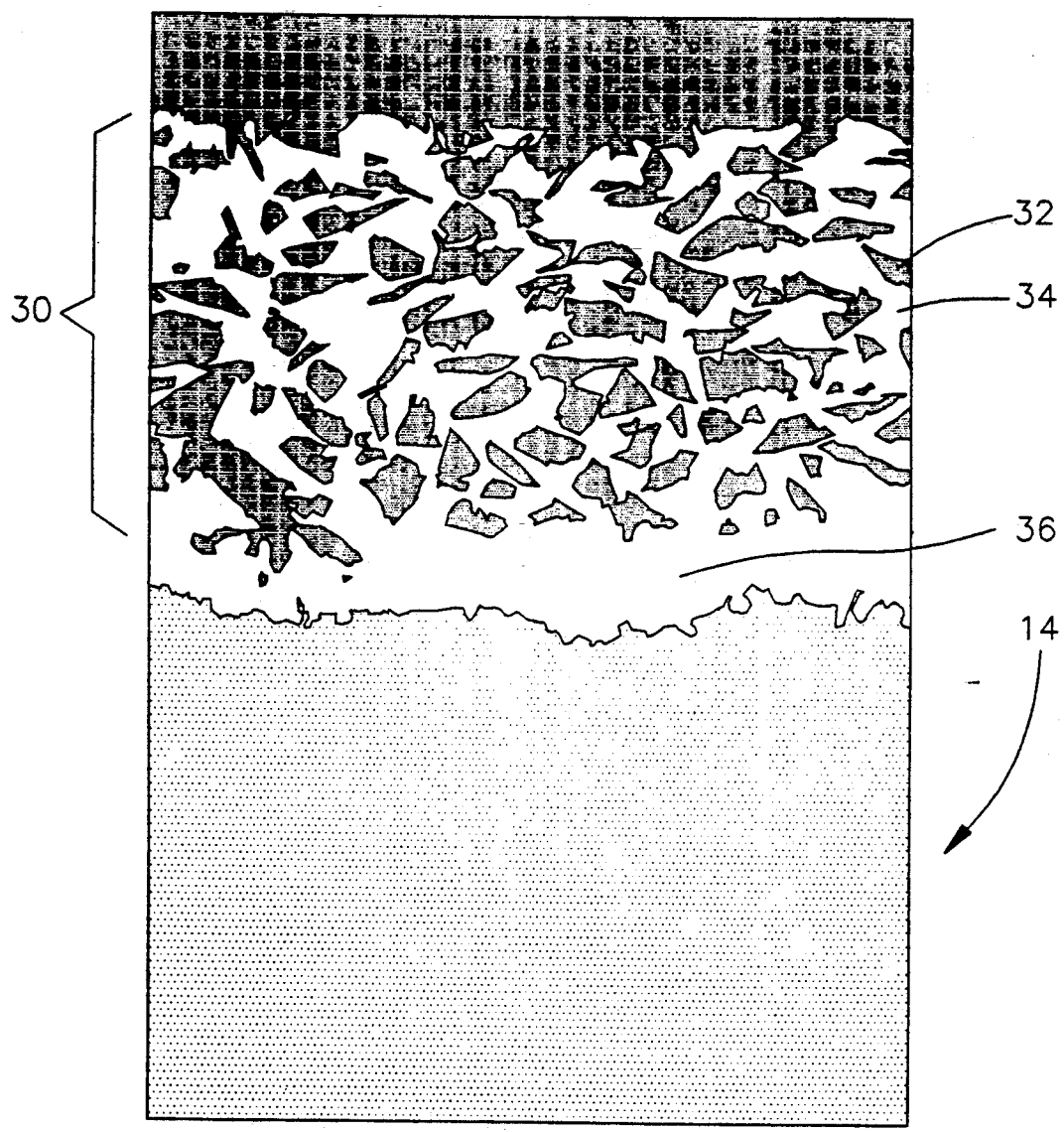
FIG. 3 shows a representative illustration of a cross-sectional microphotograph at 50× magnification of the turbine rotor blade of FIG. 2.

FIG. 3 is a 50× magnification of the single crystal abrasive rotor blade 14 and abrasive blade tip cap 30 after bonding. In the abrasive blade tip cap 30, there can be seen aluminum oxide abrasive particles 32 and the molten metal powder matrix 34, which consists essentially of the cobalt-base braze alloy (AMS 4783) and the boron-containing cobalt alloy. The bond joint interface using the AMS 4783 braze tape 36 is also shown.

The above heating rates, temperatures and durations are recommended for the preferred nickel-base superalloy, such as is used in the rotor blade 12. In addition, it is believed that the brazing temperature could vary between about 2210° F. and about 2240° F., while still achieving adequate results—i.e., minimum porosity in the abrasive blade tip cap 30 without degradation of the rotor blade's single crystal microstructure. However, the above temperatures are preferred for the particular combination and proportions of materials used. In addition, it is foreseeable that suitable results could also be obtained with holding durations which are outside of the preferred range, such as between about 110 minutes up to about 130 minutes, although the preferred range is favored since it provides the desired results within a practical production schedule.

Following the above heating steps, the preform 10 and rotor blade 12, now as the unitary abrasive rotor blade 14, are gas cooled, such as by flowing an inert gas within the furnace chamber, to a temperature of about 2000° +/−25° F. Gas cooling to this temperature is preferred because it ensures solidification of the abrasive blade tip cap 30 prior to gas fan cooling. Thereafter, the abrasive rotor blade 14 is gas fan cooled to below about 1400° F. at a rate of at least 50° F. per minute, which is sufficient to maintain the desired single crystal structure of the rotor blade 12 and resultant strength level of the rotor blade 12. The abrasive rotor blade 14 is then cooled below this temperature to room temperature by gas fan cooling or by furnace cooling. The rate of cooling below about 1400° F. does not appear to be critical to the success of this invention.

The abrasive rotor blade 14 is then assembled, along with other abrasive rotor blades 14 and possibly uncapped rotor blades 12, to a turbine wheel or other appropriate fixture and ground to the final dimensions using silicon carbide or diamond grinding wheels, following machining parameters which are generally well known in the art. In addition, the surface of the abrasive blade tip cap 30 may be chemically or electrochemically etched to better expose the abrasive particles 32 to improve initial abrasiveness.

The relatively thick (equivalent to multiple abrasive particle diameters) abrasive blade tip cap 30 provides sufficient stock for machining while retaining adequate thickness to accommodate repeated rub encounters over the life of the turbine engine. This feature is contrary to the teachings of the prior art, wherein an abrasive cap has a thickness equivalent to only one grit particle which is applied to a finish-machined rotor blade. As a result, significant assembly and disassembly operations are typically necessary because the application environment may be detrimental to some components of the rotor assembly, and the abrasive blade tip cap has a significantly shorter service life due to its limited thickness.

It has been determined that the heating schedule of this invention is capable of sufficiently consolidating and bonding the preform 10 to the rotor blade 12 with minimal loss to the integrity of the single crystal structure of the single crystal nickel-base superalloy turbine rotor blade 12. As a result, the high temperature properties of the superalloy are essentially retained, a critical factor in the environment of a modern turbine engine.

It should also be noted that the preform 10, once consolidated to form the abrasive blade tip cap 30 during the above heating schedule, is characterized as having sufficient structural and bond strength to survive the high rotational speeds and temperatures of a turbine engine and numerous rub encounters with the engine shroud. Specifically, the particular composition of the preform 10 is able to fully utilize the various stages of the heating schedule to complete the consolidation and bonding processes. In addition, the abrasive blade tip cap 30 is inherently corrosion resistant due to the presence of cobalt as the primary constituent of the metal powder matrix 34.

It is a particular feature of the present invention that the abrasive particles 32 are tightly bonded within the metal powder matrix 34, and that the active metal coating on the abrasive particles 32 serves to wet the surface of the abrasive particles 32 so as to promote a metallurgical bond between the abrasive particles 32 and the metal powder matrix 34. As a result, the retention and durability of the abrasive particles is enhanced. The metal powder matrix 34 is formulated to provide bond strength between individual abrasive particles 32 and between the abrasive blade tip cap 30 and the rotor blade 12, while also providing corrosion resistance. The bond strength is characterized as being sufficient to meet the tensile strength necessitated by the numerous rub encounters demanded of the abrasive blade tip cap 30. In addition, the bond strength is further enhanced by the fluorocarbon powder which provides a final cleansing action to the bonding surfaces of both the preform 10 and the rotor blade 12 during the consolidation and bonding cycles.

Moreover, prior to heating, the preform 10 is sufficiently rigid and has predictable shrinkage characteristics to permit a simple and economical punching or cutting operation to form the preform 10. The process of the present invention also permits relatively thick preforms 10 to be formed and bonded to the rotor blades 12 such that subsequent machining of the abrasive blade tip cap 30 can be performed to bring the rotor blade 12 into tolerance while ensuring that sufficient abrasive material will remain to provide repeated rub encounters over the life of the turbine engine.

Finally, as a primary advantage of the present invention, the heating schedule employed ensures that alteration of the single crystal microstructure is minimized, such that the high temperature capabilities of the superalloy will remain intact. The single furnace operation involved in the heating schedule of the present invention also provides a significant economic advantage from the standpoint of time, labor and energy requirements. As a result, the present invention is highly suitable for the mass production of turbine rotor blades.

While our invention has been described in terms of a preferred embodiment, it is apparent that other forms could be adopted by one skilled in the art; for example by substituting other matrix or braze compositions, such as nickel-base alloys, for the preferred cobalt-base compositions, other abrasive materials, such as cubic boron nitride, titania, zirconia or chromium carbide, for the preferred aluminum oxide, omission of either the fluorocarbon powder or binder for less demanding applications, or the use of mixtures of abrasive materials or grit sizes. Accordingly, the scope of our invention is to be limited only by the following claims.

The embodiments of the invention in which an exclusive property or privilege is claimed are defined as follows:

1. An abrasive blade tip cap preform for bonding to a rotor blade tip to form an abrasive rotor blade tip cap, said abrasive blade tip cap preform comprising:
    a metal powder matrix comprising a cobalt alloy and boron; and
    abrasive ceramic particles interspersed in said metal powder matrix, said abrasive ceramic particles being coated with a reactive metal;
    wherein said boron is present in sufficient amounts to aid in wetting and bonding together said metal powder matrix and said abrasive ceramic particles into a fully densified matrix upon sufficient heating of said abrasive blade tip cap preform.

2. An abrasive blade tip cap preform as recited in claim 1 wherein said metal powder matrix comprises:
    a cobalt-base braze alloy and a boron-containing cobalt alloy, said boron being present in said boron-containing cobalt alloy in sufficient amounts to aid in wetting and bonding together said metal powder matrix and said abrasive ceramic particles into a fully densified matrix upon sufficient heating of said abrasive blade tip cap preform;
    wherein said abrasive blade tip cap preform comprises about 20 to about 30 weight percent of said cobalt-base braze alloy and about 42 to about 52 weight percent of said boron-containing cobalt alloy.

3. An abrasive blade tip cap preform as recited in claim 1 comprising from about 10 to about 50 weight percent of said abrasive ceramic particles.

4. An abrasive blade tip cap preform as recited in claim 1 further comprising a fluorocarbon powder distributed throughout said metal powder matrix in sufficient amounts to promote a bond between said rotor blade tip cap preform and said rotor blade tip when sufficiently heated.

5. An abrasive blade tip cap preform as recited in claim 4 comprising up to about 5 weight percent of said fluorocarbon powder.

6. An abrasive blade tip cap preform as recited in claim 1 further comprising an organic binder distributed throughout said metal powder matrix in sufficient amounts to improve the green strength of said abrasive blade tip cap preform.

7. An abrasive blade tip cap preform as recited in claim 6 wherein said abrasive ceramic particles are aluminum oxide particles.

8. An abrasive blade tip cap preform as recited in claim 6 comprising from about 1 to about 7 weight percent of said organic binder.

9. An abrasive blade tip cap preform as recited in claim 1 wherein said reactive material is titanium, said abrasive ceramic particles comprising about 2 to about 4 weight percent of said titanium.

10. An abrasive blade tip cap preform for bonding to a rotor blade tip to form an abrasive rotor blade tip cap, said abrasive blade tip cap preform comprising:
    a first layer, said first layer comprising:
    a metal powder matrix including cobalt and boron; and
    abrasive ceramic particles interspersed in said metal powder matrix, said abrasive ceramic particles being coated with a reactive metal;
    a second layer comprising a cobalt-base braze alloy; and
    an organic binder between said first and second layers;
    wherein said boron is present in sufficient amounts to aid in wetting and bonding together said metal powder matrix and said abrasive ceramic particles into a fully densified matrix upon sufficient heating of said abrasive blade tip cap preform.

11. An abrasive blade tip cap preform as recited in claim 10 wherein said metal powder matrix comprises:
    a cobalt-base braze alloy and a boron-containing cobalt alloy, said boron being present in said boron-containing cobalt alloy in sufficient amounts to aid in wetting and bonding together said metal powder matrix and said abrasive ceramic particles into a fully densified matrix upon sufficient heating of said abrasive blade tip cap preform;
    wherein said abrasive blade tip cap preform comprises about 20 to about 30 weight percent of said cobalt-base braze alloy and about 42 to about 52 weight percent of said boron-containing cobalt alloy.

12. An abrasive blade tip cap preform as recited in claim 10 further comprising a fluorocarbon powder distributed throughout said first layer, said abrasive blade tip cap preform comprising up to about 5 weight percent of said fluorocarbon powder.

13. An abrasive blade tip cap preform as recited in claim 10 further comprising said organic binder throughout said first layer, said abrasive blade tip cap preform comprising from about 1 to about 7 weight percent of said organic binder.

14. An abrasive blade tip cap preform as recited in claim 10 wherein said reactive material is titanium, said abrasive ceramic particles comprising about 2 to about 4 weight percent of said titanium.

15. A rotor blade comprising:
a distal tip on said rotor blade;
an abrasive composition adhered to said distal tip, said abrasive composition comprising;
a metal powder matrix including cobalt and boron; and
abrasive ceramic particles interspersed in said metal powder matrix, said abrasive ceramic particles being coated with a reactive metal;
wherein said boron is present in sufficient amounts to aid in wetting and bonding together said metal powder matrix and said abrasive ceramic particles into a fully densified matrix upon sufficient heating of said abrasive composition.

16. A rotor blade as recited in claim 15 wherein said metal powder matrix comprises:
a cobalt-base braze alloy and a boron-containing cobalt alloy, said boron being present in said boron-containing cobalt alloy in sufficient amounts to aid in wetting and bonding together said metal powder matrix and said abrasive ceramic particles into a fully densified matrix upon sufficient heating of said abrasive composition;
wherein said abrasive composition comprises about 20 to about 30 weight percent of said cobalt-base braze alloy and about 42 to about 52 weight percent of said boron-containing cobalt alloy.

17. A rotor blade as recited in claim 15 wherein said abrasive composition comprises about 10 to about 50 weight percent of said abrasive ceramic particles.

18. A rotor blade as recited in claim 15 wherein said metal powder matrix and said abrasive ceramic particles comprise a first layer of said abrasive composition, said rotor blade further comprising a second layer comprising a cobalt-base braze alloy adhered to said first layer.

19. A rotor blade as recited in claim 18 wherein said metal powder matrix comprises:
a cobalt-base braze alloy and a boron-containing cobalt alloy, said boron being present in said boron-containing cobalt alloy in sufficient amounts to aid in wetting and bonding together said metal powder matrix and said abrasive ceramic particles into a fully densified matrix upon sufficient heating of said abrasive composition;
wherein said abrasive composition comprises about 20 to about 30 weight percent of said cobalt-base braze alloy and about 42 to about 52 weight percent of said boron-containing cobalt alloy.

20. A rotor blade as recited in claim 18 wherein said abrasive composition comprises about 10 to about 50 weight percent of said abrasive ceramic particles.

* * * * *